United States Patent Office 3,300,729
Patented Jan. 24, 1967

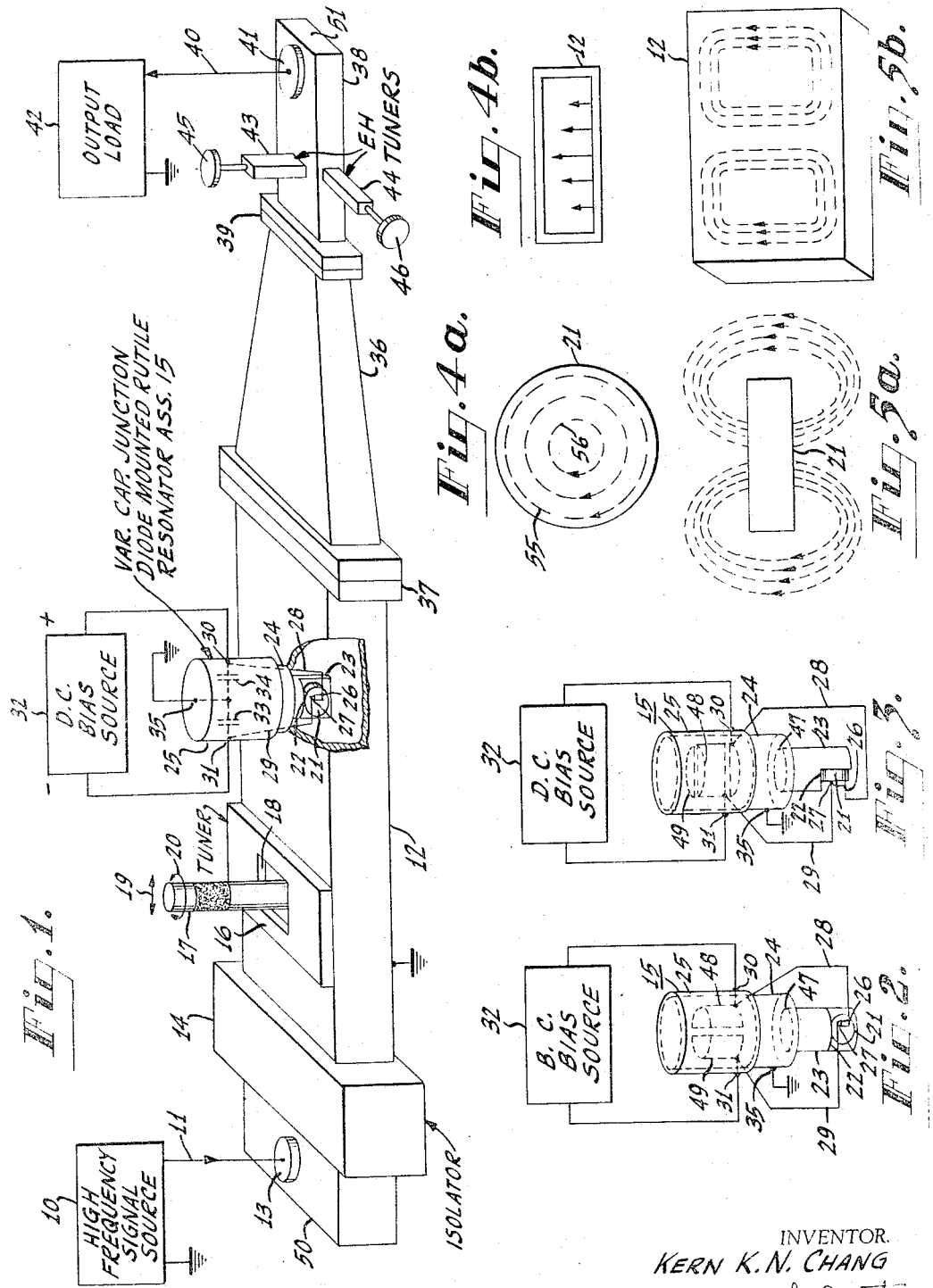

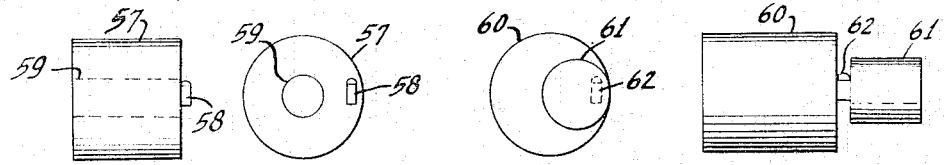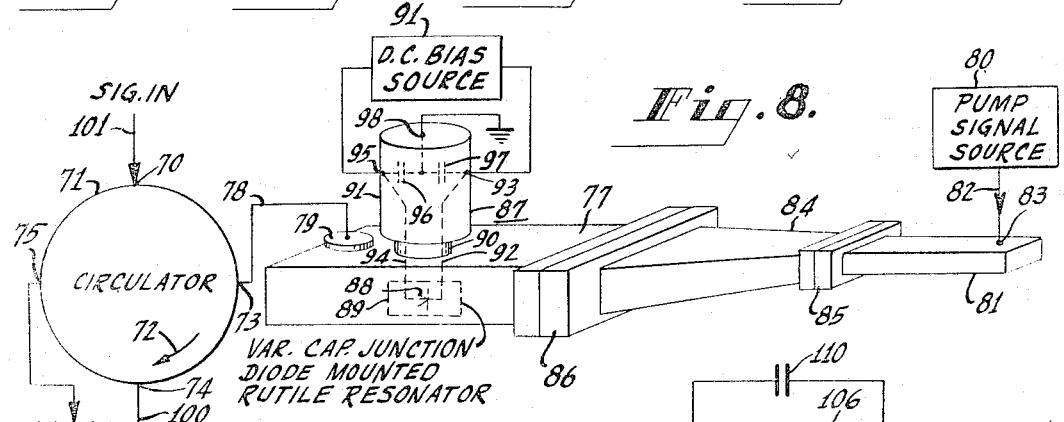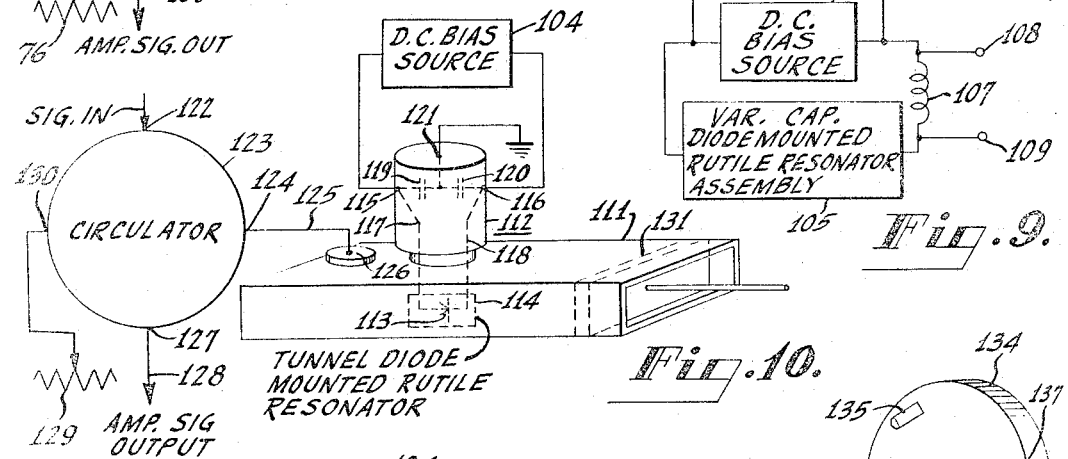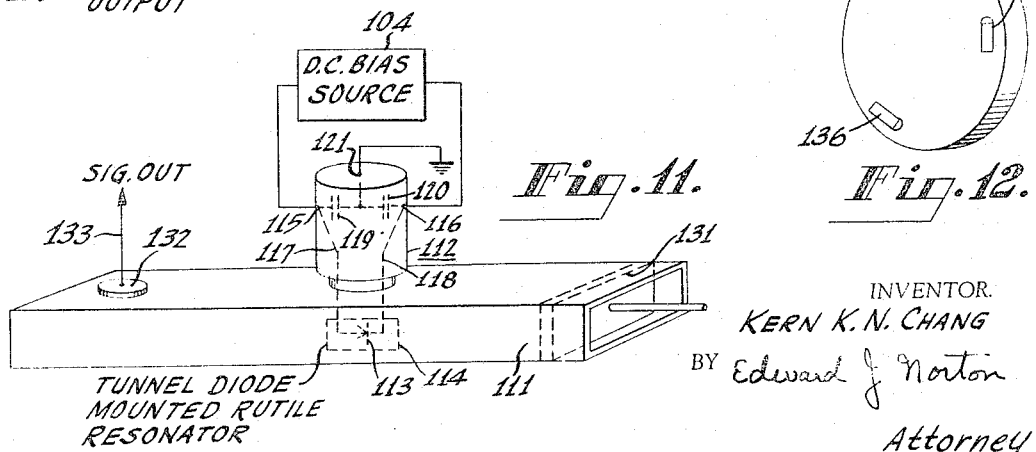

3,300,729
NON-LINEAR ELEMENT MOUNTED HIGH DI-
ELECTRIC RESONATOR USED IN PARA-
METRIC AND TUNNEL DIODE AMPLIFIERS,
HARMONIC GENERATORS, MIXERS AND
OSCILLATORS
Kern K. N. Chang, Princeton, N.J., assignor to Radio
Corporation of America, a Delaware corporation
Filed Oct. 30, 1963, Ser. No. 320,092
23 Claims. (Cl. 330—4.9)

This invention relates generally to improved devices using non-linear elements, and, particularly, to improved devices using a non-linear element with a resonator constructed of high dielectric constant material in a manner to provide efficient operation at frequencies up to and including millimeter and sub-millimeter wavelengths. As employed herein, the term non-linear element is intended to mean any active material whether film, bulk or junction type which exhibits a non-linear behavior in resistance, capacitance and/or inductance.

Various types of devices including non-linear elements in the form of variable capacitance, semiconductor junction diodes and tunnel diodes, for example, are presently being operated at ultra high and microwave frequencies to perform harmonic generation, amplification, and other functions. Typically, such elements are operated with a metallic waveguide or coaxial cavity resonated at a particular frequency so as to bring about the type of operation desired. Such operation is possible, because the non-linear characteristic of the elements, when properly operated, is nearly loss free.

Efforts to operate devices including non-linear elements at millimeter and higher frequencies, however, have been handicapped by large circuit losses and deteriorated performance due to the loading of the waveguide or coaxial resonant cavity by the elements at these frequencies. For example, in the case of a variable capacitance, semiconductor junction diode operated in a resonant waveguide cavity, the shunt capacitance of the diode acts, in effect, to detune the resonant cavity. Since the capacitance of the waveguide cavity is not large with respect to that presented by the diode, any capacitance presented by the diode when added to that of the waveguide cavity materially alters the overall capacitance of the circuit configuration including the diode and the cavity, resulting in a corresponding change in operating frequency. The diode is desirably fabricated to provide as small a capacitance as can be permitted in a given application. Even where such a step is taken, it has been found to be extremely difficult to avoid undesirable frequency instability and serious deterioration of the circuit Q in the operation of the devices.

It is therefore an object of the invention to provide improved devices using non-linear elements in a manner which facilitates the fabrication and efficient operation of such devices at frequencies up to and including millimeter and sub-millimeter wavelengths.

A further object is to provide improved devices capable of satisfactory operation at frequencies up to and including millimeter and sub-millimeter wavelengths by employing a non-linear semiconductor element with a resonator constructed of high dielectric constant material.

Another object is to provide improved resonator devices capable of efficient operation at frequencies up to and including millimeter wavelengths.

Still another object is to provide an improved harmonic generator including a non-linear, variable capacitance, semiconductor junction diode.

The use of low-loss, high dielectric constant insulating materials as an efficient resonant circuit element in high frequency applications is known. As reported in an article entitled "The Rutile, Microwave Resonator," by A. Okaya, Proc. I.R.E., November 1960, page 1921, and elsewhere, titanium dioxide ($TiO_2$), more commonly known as rutile, is one example of a high dielectric constant insulating material which can be made to function as a resonator in such applications. A rutile resonator has a dielectric constant of approximately 90 and a low dissipation factor. It has numerous modes of oscillation when properly energized, and exhibits field patterns of various modes which are similar to those in conventional waveguide and coaxial cavity resonators. It has been discovered that, because of the high dielectric constant and low dissipation factor, an electric field of strong intensity exists at the surface of a rutile resonator which is mostly tangential in order to satisfy the boundary condition.

Briefly, in the embodiment described herein, the tangential electric field on the surface of a rutile resonator is utilized to activate a non-linear semiconductor junction diode positioned on the surface of the rutile resonator, the rutile resonator serving to couple energy to and converted energy from the diode. The diode mounted rutile resonator can be arranged to operate as a harmonic generator, an amplifier, a mixer, or an oscillator, as well as in other circuit arrangements.

Because a rutile resonator has a high dielectric constant, the loading effect on the rutile resonator of any other external dielectric material having a dielectric constant lower than that of rutile is small. A non-linear semiconductor junction diode can be conveniently integrated on the surface of a rutile resonator without substantially loading or otherwise shorting out the applied field in the rutile resonator. If a variable capacitance, semiconductor junction diode is used, for example, the capacitance presented by the diode is small relative to the total capacitance of the circuit configuration including the resonator and diode, permitting the fabrication of a superior diode without adherence to the physical and electrical limitations encountered when a conventional metallic waveguide or coaxial cavity resonator is used. By making use of the diode mounted rutile resonator, devices capable of operation at frequencies up to and including millimeter and submillimeter wavelengths are possible with considerably improved efficiency as compared to previously available devices. Since a rutile resonator is a small, compact element, the use of a diode mounted rutile resonator also simplifies both the construction and operation of such high frequency devices.

A more detailed description of the invention will now be given in connection with the accompanying drawing, in which:

FIG. 1 is partly a perspective view and partly a block diagram of a harmonic generator illustrating one embodiment of a non-linear device constructed according to the invention;

FIG. 2 is a front view and FIG. 3 is a side view showing in greater detail the diode mounted rutile resonator assembly in the harmonic generator of FIG. 1;

FIG. 4a shows the electric field pattern in a rutile resonator as used in the harmonic generator of FIG. 1, and FIG. 4b shows for purposes of comparison the electric field pattern in a conventional waveguide structure;

FIG. 5a shows the magnetic field pattern in a rutile resonator as used in the harmonic generator of FIG. 1, and FIG. 5b shows for purposes of comparison the magnetic field pattern in a conventional waveguide structure;

FIG. 6a is a side view and FIG. 6b is an end view of a junction mounted TEM coaxial rutile resonator which can be used in place of the rutile resonator shown in FIGS. 1, 2 and 3;

FIG. 7a is an end view and FIG. 7b is a side view of another form which the rutile resonator shown in FIGS. 1, 2 and 3 can take;

FIG. 8 is partly a perspective view and partly a block diagram of a parametric amplifier illustrating in simplified form a further embodiment of a non-linear device constructed according to the invention;

FIG. 9 is a simplified circuit diagram illustrating the manner in which the arrangement of FIG. 1 can be modified to provide a mixer;

FIG. 10 is partly a perspective view and partly a block diagram of a tunnel diode amplifier illustrating in simplified form another embodiment of a non-linear device constructed according to the invention;

FIG. 11 is partly a perspective view and partly a block diagram of a tunnel diode oscillator illustrating in simplified form still another embodiment of a non-linear device constructed according to the invention; and FIG. 12 shows another form which the diode mounted resonator assembly in the embodiments of FIGS. 1, 8, 9, 10 and 11 may take.

In describing the harmonic generator shown in FIG. 1, reference will be made to the actual frequencies, values and dimensions uesd in a tripler, harmonic generator constructed according to the invention. The particular circuit parameters are given to aid in the understanding of the invention, and can be changed according to the needs of a particular application in the manner outlined below.

A high frequency signal source 10 is shown. The source 10 may take the form of a klystron or other high frequency tube-type power supply in applications where the harmonic generator is included in a high frequency oscillation generator. Where the harmonic generator is used to change the frequency of a modulated or intelligence carrying signal, the source 10 represents any suitable communication path adapted to forward and otherwise process the signal. It will be assumed that the source 10 supplies a signal having a frequency of 8K mc. (thousand megacycles) at a power level of approximately 50 mw. (milliwatts). The signal appearing at the output of the source 10 is fed over a coaxial or other suitable connection represented by lead 11 to a rectangular, waveguide section 12 via suitable connecting means 13 mounted on a broad wall near the enclosed end 50 of the waveguide 12.

The waveguide 12 can be constructed of brass which is silver plated internally of the waveguide. Based on the assumed input signal frequency of 8K mc., the waveguide 12 is dimensioned to support frequencies in the X-band and can be one inch wide by one-half inch deep. The signal energy coupled into the waveguide 12 from the source 10 is first directed through an isolator 14. The isolator 14, which may be constructed of ferrite in the usual manner, serves to prevent reflected signal energy in the waveguide 12 from being fed back to the source 10. The signal energy next travels along the waveguide 12 to a variable capacitance, semiconductor junction diode mounted rutile resonator assembly indicated generally as 15.

A tuner 16 serves to eliminate reflections caused by the discontinuity introduced in the waveguide 12 by the rutile resonator assembly 15. The tuner 16 is of conventional construction and can include a rod or similar means, not shown, inserted into the waveguide 12 parallel to the lines of electric force. Such an arrangement introduces an additional or added reflection which is made substantially equal in amplitude but opposite in phase to that caused by the assembly 15, so as to cancel the reflection caused by the discontinuity. A post 17 is mounted in a slot 18 and, as indicated by the arrow 19, is arranged for longitudinal movement within the confines of the slot 18 so as to position the rod inside the waveguide 12 along the longitudinal axis of the waveguide 12. The post 17 is also arranged for rotative movement, as indicated by the arrow 20, which determines the depth of penetration of the rod inside the waveguide 12. In substance, the phase of the added reflection is adjusted by operating the post 17 to vary the longitudinal position of the rod inside the waveguide 12, and the magnitude of the added reflection is adjusted by operating the post 17 to vary the penetration of the rod inside the waveguide 12.

The waveguide 12 is broken away to show that portion of the rutile resonator assembly 15 which is positioned inside the waveguide 12. A titanium dioxide ($TiO_2$) crystalline structure, referred to herein as a rutile resonator, is shown in the shape of a cylindrical disc 21. The resonator 21 can be a single crystal or polycrystalline element. The volume and therefore the size of the rutile resonator or disc 21 is determined in a particular application to be approximately equal to the volume of a mechanical cavity operating at the same frequency divided by $(\sqrt{\epsilon})^3$, where $\epsilon$ equals the relative dielectric constant of the rutile resonator 21. In the case of the tripler, harmonic generator illustrated and cited herein by way of example only, the rutile resonator 21 was of single crystal construction approximately .09 inch in diameter and approximately .04 inch thick.

The rutile resonator 21 is positioned on a seat 22 formed by cutting away a portion of the material at the end of a rod 23. The rutile resonator 21 is secured at one of its broad surfaces to the rod 23 at the seat 22 by a suitable one of the low loss glue materials identified as epoxy glues. Other suitable fastening means may be used. The rod 23 is preferably constructed of beryllium oxide or other temperature conducting, electrically insulating material to act as a heat sink for the rutile resonator 21. In applications where a heat sink is not desired, the rod 23 can be constructed of Lucite or other similar electrical insulating material.

The rod 23, which is of a length to position the rutile resonator 21 substantially at the center of the waveguide 12 to provide the maximum degree of coupling of signal energy between the waveguide 12 and the rutile resonator 21, passes first through an opening, not shown, in the wall of the waveguide 12 and is then securely fastened to a metallic, cylindrically shaped member 24. Suitable means may be provided for fixedly mounting the assembly 15 on the waveguide 12. By way of example, the assembly 15 can be arranged so that it screws into a suitable receptacle on the waveguide 12. As shown in FIGS. 2 and 3 to be described, the upper portion of the member 24 is imbedded in a cylindrically shaped cap 25 formed of plastic or other encapsulating material.

A variable capacitance, semiconductor alloyed junction diode including a main body 26 and a dot 27 is mounted at the edge of the exposed, flat surface area of the rutile resonator 21. The preformed diode is secured to the rutile resonator 21 surface by a low loss, epoxy glue or any other suitable material. In the alternative, the diode may be formed directly by depositing on the rutile resonator 21 surface the semiconductor material forming the dot 27 and the body 26 in a manner to complete the alloyed junction diode. The main body 26 of the diode is constructed of one type, for example, N-type semiconductor material with the dot 27 being formed of the other type or P-type semi-conductor material. The diode including the dot 27 and body 26 is oriented so that a line drawn through the body 26 and dot 27 is tangential to the curved edge of the rutile resonator 21, to obtain the maximum coupling of signal energy between a tangential and azimuthal electric field at the outer boundaries of the rutile resonator 21 surface and the diode. In the case of the tripler harmonic generator illustrated, a gallium arsenide P–N alloyed junction diode was used. The main body 26 of the diode was approximately .02 inch long and .01 inch wide with a .003 inch dot 27. The diode provided by the dot 27 and body 26 exhibited a capacitance of approximately 1.0 micro-microfarad with a series resistance of approximately 2 ohms. The rutile resonator 21, the post 23, and the dot 27 and body 26 of the junction diode are not drawn to scale but are shown enlarged in size for purposes of illustration.

If a junction diode of the type provided in the arrangement of FIG. 1 by the dot 27 and the body 26 is biased in the reverse (non-conducting) direction, mobile charge carriers present in the semiconductor material are moved away from the junction, leaving uncompensated fixed charges in a region near the junction. The width, and hence, the electrical charge of this region (space-charge layer) depends on the applied voltage giving rise to a junction transition capacitance. The junction diode transition capacitance is inversely proportional to the effective width of the junction, and, since the effective junction width is voltage dependent, the capacitance afforded by the junction diode is voltage dependent. In other words, a semiconductor junction when biased in the reverse or non-conducting direction is a capacitance the value of which can be controlled by varying the bias voltage.

In order that the diode 26, 27 supply the proper capacitance, a lead 28 connected at one end to the main body 26 of the diode is brought out through the opening, not shown, in the waveguide wall providing access to the waveguide 12 for the rod 23. The other end of the lead 28 is connected to a terminal 30 mounted on the cap 25. Another lead 29 insulated from the lead 28 and connected at one end to the dot 27 of the diode is brought out of the waveguide 12 through the same opening, and is connected at its other end to a terminal 31 also mounted on the cap 25. A D.C. (direct current) bias source 32 is connected between the two terminals 30, 31 on the cap 25. The bias source 32 is connected in the polarity shown and supplies a reverse bias voltage of the proper level, for example, 1 to 2 volts, across the diode 26 and 27 so that it is operated at the desired capacitance value. The leads 28, 29 can be passed through holes placed in the rod 23 to facilitate the passage of the leads 28, 29 through the opening in the waveguide 12 or any other suitable arrangement may be used to bring the leads 28, 29 out of the waveguide 12 to the respective terminals 30, 31.

A pair of RF (radio frequency) by-pass capacitors 33 and 34, indicated by dotted lines as mounted within the cap 25 are connected in series between the terminals 30, 31. The junction of the two capacitors 33, 34 is connected to a terminal 35 provided on the cap 25 with the terminal 35 being, in turn, connected to a point of reference potential or ground, thereby avoiding the appearance of RF across the D.C. bias source 32.

In order to minimize the loss of RF signal energy due to the presence of leads 28 and 29, the leads 28, 29 can be each made approximately one-quarter wavelength long at the operating fundamental frequency of the diode mounted rutile resonator assembly 15. With this arrangement, the leads 28, 29 grounded for RF via capacitors 33, 34 appear as an open circuit to 8K mc. and 24K mc. RF signal energies, effectively reducing the loss of RF signal energies. Other means can be used to block the appearance of RF signal energy on leads 28, 29. An RF choke can be connected between leads 28, 29 in close proximity to the diode including the dot 27 and the body 26, and/or suitable resistance wire can be used for the leads 28, 29.

The diode mounted rutile resonator assembly 15 operates in response to the received 8K mc. RM signal energy to produce within the waveguide 12 RF signal energy having a frequency of 24K mc., as explained hereinafter. A tapered waveguide section 36 serves to couple the 24K mc. RF signal energy from the waveguide 12 to a K-band waveguide section 38. The usual flange arrangement 37 is provided to connect the waveguide 12 and the waveguide 36 with a similarly constructed but smaller flange arrangement 39 serving to connect the waveguide 36 and the waveguide 38. The waveguide 36 is preferably made 5 to 10 wavelengths long at the fundamental RF frequency or 8K mc. in order to reduce to a minimum the amount of such signal energy coupled into the waveguide 38. Both the tapered waveguide section 36 and the K-band waveguide section 38 can be constructed of brass silver plated internally to improve radio frequency conduction. The waveguide 38 is dimensioned to support the 24K mc. RF signal energy and is, for example, one-half inch wide and one-quarter inch deep.

A coaxial or other connection represented by lead 40 connected to suitable mounting means 41 positioned near the enclosed end 51 of the waveguide 38 serves to couple the 24K mc. RF signal energy to an output load or utilization circuit 42. A pair of EH tuners 43, 44 are mounted on the waveguide 38 to obtain a proper impedance match between the output load 42 and the waveguide 38. The tuners 43, 44 are of conventional design and each consists of a waveguide cavity the volume of which is determined by means of a movable shorting plate, not shown, operated by suitable control knobs 45 and 46, respectively.

The signal source 10, the waveguide structure including the three waveguide sections 12, 36 and 38, the output load 42, and the terminal 35 are all shown as being connected to a point of reference potential or ground. In practice, this ground connection can take the form of a metallic bus bar or similar arrangement. If coaxial connections are used for the leads 11 and 40 in a manner to provide return paths with the terminal 35 being connected by any suitable means to a wall of the waveguide structure shown, the waveguide structure itself acts as the ground return path, avoiding the need for external connections.

An enlarged and more detailed view of the diode mounted rutile resonator assembly 15 shown in FIG. 1 is presented in FIGS. 2 and 3. FIG. 2 is a front view of the assembly 15 looking directly at the exposed, broad surface area of the rutile resonator 21 and FIG. 3 is a side view of the diode mounted rutile resonator assembly 15 showing more clearly the manner in which the rutile resonator 21 is positioned at the seat 22 on the rod 23. Elements in FIGS. 2 and 3 corresponding to elements in FIG. 1 are given the same reference numerals. The metallic, cylindrically shaped member 24 is shown as being hollow with one end enclosed so as to provide a surface area 47 to which the rod 23 can be secured. The upper portion and the open end of the member 24 are covered by the plastic cap 25 to protect and yet facilitate the handling of the assembly 15.

Lead 28, in addition to being connected to the terminal 30, is connected between the main body 26 of the diode and a metallic, semicircularly shaped post 48 which may be constructed of copper or other current conducting material. Lead 29, in addition to being connected to terminal 31, is connected between the dot 27 of the diode and a second metallic, semicircularly shaped post 49 of the same construction as the post 48. The two posts 48, 49 are spaced apart inside the member 24 with the curved surfaces of the posts 48, 49 being spaced in close proximity to but not touching the inner wall of the member 24. The remaining open area within the member 24 is filled with an insulating material such as a polytetrafluorethylene material identified as Teflon. A ground connection is made to the member 24 by means of the terminal 35.

A first RF by-pass capacitor connected between the terminal 30 and ground is formed by the post 48 and member 24. A second RF by-pass capacitor connected between the terminal 31 and ground is formed by the post 49 and the member 24. The two RF capacitors formed in this manner correspond to the capacitors 33 and 34 indicated by dotted lines in FIG. 1, and serve to avoid the appearance of RF signal energy across the D.C. bias source 32. The assembly 15 provides a preferred means for properly positioning the rutile resonator 21 having a junction diode formed thereon inside the waveguide 12.

In positioning the disc-shaped, rutile resonator 21 in the waveguide 12, it is preferred that the broad, flat surface area of the rutile resonator 21 shown in FIG. 1 as having the junction diode mounted thereon be parallel with the narrow or side walls of the waveguide 12 and at right angles with the broad walls of the waveguide 12. The edge or curved surface area of the rutile resonator 21 is that portion of the rutile resonator 21 seen from either longitudinal end of the waveguide 12. The reason for positioning the rutile resonator 21 in this manner can be understood with the aid of the field patterns shown in FIGS. 4 and 5. FIG. 4a shows the electric field pattern present in the rutile resonator 21 of FIG. 1 when the rutile resonator 21 is energized or excited at 8K mc. Circular lines of electric force occur at the surface of the rutile resonator 21. These lines of electric force are of the strongest intensity near the outer boundary of the rutile resonator 21 as indicated by the dashed line 55, decreasing in intensity toward the center of the rutile resonator 21, as indicated by the dashed line 56. The $TE_{01}$ electric field pattern in a conventional metallic waveguide such as the waveguide 12 of FIG. 1, when energized, is shown in FIG. 4b. The lines of electric force are straight and extend parallel to the narrow walls of the waveguide 12.

FIG. 5a shows a magnetic field pattern of the rutile resonator 21 when energized at 8K mc. The view is toward the edge or curved surface area of the rutile resonator 21. The lines of magnetic force are distributed about the edge of the rutile resonator 21. As shown in FIG. 5b, the magnetic field pattern present in the waveguide 12, when energized, occurs in planes parallel to the broad walls of the waveguide 12. By comparing the magnetic field patterns shown in FIGS. 5a and 5b, it can be seen that, if the rutile resonator or disc 21 is positioned with its aflt surfaces parallel to the narrow walls of the waveguid 12, the magnetic field pattern of the rutile resonator 21 shown in FIG. 5a exists in the same planes and with substatnially the same distribution as the magnetic field pattern of the waveguide 12. Because of this relationship, signal energy at 8K mc. is readily coupled between the rutile resonator 21 and the waveguide 12.

If the rutile resonator 21 is positioned with its flat surfaces parallel to the broad walls of the waveguide 12 or with its flat surfaces at right angles to both the broad and narrow walls of the waveguide 12, the lines of magnetic force distributed about the rutile resonator 21 are at right angles to lines of magnetic force in the waveangle 12, resulting in a greatly reduced amount of signal energy being coupled between the rutile resonator 21 and the waveguide 12. Therefore, by positioning the rutile resonator 21 in the manner shown in FIG. 1 with its flat surfaces parallel to the narrow walls of the waveguide 12, maximum energization of the rutile resonator 21 takes place by the coupling of signal energy between the rutile resonator 21 and the waveguide 12.

In the operation of the harmonic generator shown in FIG. 1, the 8K mc. signal supplied by the signal source 10 is coupled into the waveguide 12 and travels along the waveguide 12 to the diode mounted rutile resonator assembly 15. The signal energy present in the waveguide 12 and magnetically coupled to the rutile resonator 21 excites the rutile resonator 21 into oscillation. By positioning the junction diode including dot 27 and body 26 so that it is coupled to the strongest lines of electric forces in the rutile resonator 21 shown in FIG. 4a as the dashed line 55, the capacitance of the diode determined by the setting of the reverse bias voltage supplied from the source 32 is effectively added to that of the rutile resonator 21. The rutile resonator 21 is dimensioned, as above, so that with the added capacitance of the junction diode useful modes of oscillation exist in the rutile resonator 21 at both the fundamental 8K mc. frequency and the desired harmonic or 24K mc.

By way of example, the combination of the rutile resonator 21 and junction diode can be considered in this particular case equivalent in operation to a quarter-wave length transmission line which is tuned to support a fundamental frequency and a desired odd harmonic of the fundamental frequency. The 24K mc. harmonic signal is coupled from the rutile resonator 21 to the waveguide 12. The tapered waveguide section 36, in turn, serves to couple the harmonic signal to the waveguide 38 from which the 24K mc. signal is fed to the output load 42. In the case of the tripler, harmonic generator with the circuit parameters given above, a 25K mc. signal was obtained with a measured conversion loss of —9 db.

One way of describing the arrangement is to say that the resonator 21 is immersed in the ambient within the waveguide 12. Thus the resonator 21 is immersed in the waveguiding space within the hollow pipe waveguide 12. The non-linear element, in this case the diode 26, 27, is at the interface between the resonator 21 and the low dielectric ambient or space within the waveguide 12. The electromagnetic field planes tend to be greatest or strongest at this interface. Hence a strong coupling of the element 26, 27 between the waveguide 12 and the resonator 21 is obtained by positioning the element 26, 27 at this interface.

In considering the operation of the harmonic generator shown in FIG. 1, it is to be noted that the waveguide section 12 is not a resonant cavity in the sense that it is tuned to support a particular frequency or frequencies. The waveguide 12 is of conventional construction and is dimensioned to support the range of frequencies of interest. The rutile resonator 21 comprises the resonant circuit for use with the junction diode and operates with the junction diode to generate the harmonic desired. The waveguide 12 serves to couple signal energy of the fundamental frequency to the rutile resonator 21 and to couple the converted signal energy of the harmonic frequency from the rutile resonator 21.

By using a high dielectric constant material for the resonator, the capacitance presented by the junction diode is small with respect to that of the resonator. The overall capacitance is largely that of the resonator. The presence of the non-linear capacitance presented by the junction diode does not materially short out the field applied to the resonator or otherwise excessively load the resonator in a manner resulting in a deterioration of performance at millimeter and higher wavelengths.

This is in contrast to the usual arrangement in which the non-linear capacitance of a junction diode is included with a metallic waveguide cavity or similar structure for operation at millimeter wavelengths. Here, the added capacitance presented by the junction diode is large with respect to the capacitance of the cavity. Assuming that the same diode is used with a rutile resonator and with a conventional waveguide cavity, the capacitance of the diode is considerably larger relative to the capacitance of the waveguide cavity than it is relative to the capacitance of the rutile resonator. In the use of a conventional waveguide cavity, the added capacitance presented by the diode shorts out an appreciable amount of the applied field, oftentimes completely preventing the operation of the resonant cavity. Since the rutile resonator, in addition to having a high dielectric constant, is nearly loss free at microwave and millimeter wavelengths, it can be made of small volume yet of strong electromagnetic field concentration. An efficient signal energy conversion device for operation at millimeter and higher wavelengths is provided.

A separate D.C. bias source 32 is shown in FIG. 1 for properly providing the necessary reverse bias voltage to the junction diode including dot 27 and body 26. The construction of the diode mounted rutile resonator assembly 15 can be simplified by providing self-biasing means for the diode, avoiding the need for the leads 28, 29 and the source 32. Such self-biasing means can taken the form of a properly sized resistor connected between the dot 27 and body 26 or any other suitable construction.

In describing the rutile resonator 21 shown in FIG. 1, the rutile resonator 21 is assumed to be a solid crystalline element. The rutile resonator 21 is dimensioned by means of trial and error or more rigorous mathematical techniques to support with the added capacitance of the junction diode the particular fundamental and harmonic frequency desired. A harmonic generator including a diode mounted rutile resonator assembly similar to the assembly 15 can in this manner be constructed to provide any one of a wide range of harmonic signals. The second, fourth, fifth, sixth or higher harmonic can be provided. The designer, knowing the harmonic desired, can construct the assembly 15 so as to provide that particular harmonic signal.

While a particular rutile resonator can be made to resonate in the proper manner at a given harmonic frequency, it may not be possible to find resonant frequencies on a desired harmonic relation in the rutile resonator. In another case, it may be impossible or inconvenient to position the junction diode on the rutile resonator so that it interacts with the main electric field of both the fundamenal and desired harmonic frequencies. Also, while the rutile element may be found to resonate at one harmonic, for example, the third, it may not resonate at another desired harmonic, for example, the second.

To provide greater flexibility as to operating frequency, a TEM rutile coaxial resonator can be used. FIG. 6a is a side view showing the curved surface of such a rutile resonator 57, while FIG. 6b is a view showing a flat or end surface of the resonator 57. A variable capacitance, semiconductor junction diode 58 is shown positioned on the end surface near the edge of the resonator 57. An aperture 59 extends the length of the resonator 57, there being a ratio of approximately two to one between the radius of the resonator 57 and that of the aperture 59. A rutile coaxial resonator 57, as shown in FIG. 6, may be dimensioned to provide many harmonics of a given fundamental frequency. Further, the harmonics are all in the same TEM mode. A harmonic generator can be constructed in the manner of that shown in FIG. 1 including suitable means for coupling the rutile resonator to the waveguide so that by properly choosing the load a selection of one of the available harmonics is provided.

A further modification of the rutile resonator assembly is shown in FIGS. 7a and 7b. A pair of solid, cylindrical rutile elements 60, 61 are shown with a junction diode 62 mounted therebetween. FIG. 7a is a top or end view of the assembly, while FIG. 7b is a side view showing the curved surfaces of the elements 60, 61. The diode 62 is positioned to couple to the main electric field in both of the resonators 60 and 61. The operation of the rutile resonator assembly is enhanced by dimensioning one of the cylindrical elements, for example, the larger element 60 to resonate in a given mode of oscillation at the fundamental frequency with the smaller element 61 being dimensioned to resonate at the desired harmonic in a similar mode of oscillation when excited by signal energy coupled to it via the diode 62. That is, the smaller resonator 61 serves to encourage and enhance the generation of the harmonic signal across the diode 63, reducing the requirements otherwise placed on the resonator 60 as to the frequencies supported thereby. In this manner, the efficient generation of both the fundamental and desired harmonic across the diode 62 can be obtained without relying on a single resonant, rutile element to properly support both frequencies of interest.

A particular non-linear device in the form of a harmonic generator has been described in connection with FIG. 1. A non-linear device can be constructed according to the invention for use in other circuit arrangements. FIG. 8 is partly a perspective view and partly a block diagram of a parametric amplifier in simplified form. A carrier signal to be amplified is applied by means of a suitable connection represented by lead 101 to one port 70 of a four port unidirectional wave transmitting device shown as a ferrite circulator 71. The circulator 71 is a nonreciprocal device which is constructed to transmit wave energy incident on one port to only the next successive port, in the direction of the arrow 72 shown in the drawing. Thus, for example, wave energy incident on the port 70 is forwarded only to the second port 73. Wave energy received at the second port 73 from external circuits connected thereto is forwarded only to the third port 74. Similarly, any wave energy received at the third port 74 from external circuits connected thereto is forwarded only to the fourth port 75 where a matched terminating resistor 76 is connected. The matched terminating resistor 76 prevents energy from being reflected back to the first port 70. This coupling of wave energy only to a next successive port may be obtained by the use of magnetized bimetallic ferrites in such devices. A description of the operation and construction of circulators is found in an article "The Elements of Nonreciprocal Microwave Devices," Proceedings of the IRE, October 1956, page 1345.

The carrier signal having a frequency of 8K mc., for example, and incident on the first port 70 of the circulator 71 is fed from the second port 73 to one end of a metallic, rectangular waveguide section 77 by means of a coaxial or other connection represented by lead 78 and a coaxial-to-waveguide transducer 79. Signal energy at pump frequency, for example, 25K mc., is fed from a suitable source 80 to a waveguide section 81 by means of a coaxial or other connection represented by lead 82 and a coaxial-to-waveguide transducer 83. A tapered waveguide section 84 connected to one end to the waveguide 81 by a flange arrangement 85 and at the other end to waveguide 77 by a similar but larger flange arrangement 86 serves to couple signal energy at pump frequency into the waveguide 77. The tapered waveguide section 84 is dimensioned to minimize the coupling of signal energy at the carrier frequency from the waveguide 77 to the waveguide 81.

A variable capacitance, semiconductor junction diode mounted rutile resonator assembly 87 is positioned on the waveguide 77. A rutile resonator 89 having a variable capacitance, semiconductor junction diode 88 mounted thereon is located centrally of the waveguide 77 by means of suitable structure, not shown. The arrangement of the rutile resonator 89 and diode 88, as well as the means for positioning them in the waveguide 77 can be the same as that shown in and described in connection with FIGS. 1 through 3, and has been indicated in FIG. 8 by dotted lines in order to simplify the drawing. Similarly, the remainder of the assembly 87 including a metallic, cylindrical member 90 and plastic cap 91 can be identical to the corresponding structure shown in FIGS. 1 through 3. One terminal of the diode 88 is connected by a lead 92 to a terminal 93 provided on the cap 91, and the other terminal of the diode 88 is connected by a lead 94 to a second terminal 95 provided on the cap 91. A pair of RF by-pass capacitors 96, 97 represented by dotted lines are connected in series between the two terminals 93, 95 on the cap 91 with the junction of the two capacitances 96, 97 being connected to ground via a third terminal 98 provided on the cap 91. A D.C. bias source 99 is connected between the terminals 93 and 95 and arranged to provide a proper reverse bias voltage across the diode 88.

In the operation of the parametric amplifier shown in FIG. 8, the signal energy of carrier frequency and the signal energy of pump frequency travel along the waveguide 77 and are magnetically coupled to the rutile resonator 89. The rutile resonator 89 is dimensioned so that, with the added capacitance presented by the diode 88, the rutile resonator 89 is resonate at both the carrier and pump frequencies. Signal energy of a third or idler frequency equal to the difference between the pump and carrier frequencies or 13K mc. in the example given is produced by the non-linear interaction of the pump and carrier frequencies across the diode 88. The variable capacitance represented by the diode 88 is driven at the sum of the carrier and idler frequencies, resulting in energy being added to the carrier frequency wave by the pump. The parametric action is similar to that which occurs in any degenerative parametric amplifier. The resulting amplified signal energy at the carrier frequency of 8K mc. is fed back to the second port 73 of the circulator 71 and appears at the third port 74 of the circulator 71 for application to an output circuit via connections represented by lead 100. The connections represented by lead 100 include the usual filtering means for selecting the desired signal energy at carrier frequency from that appearing at the third port 74 of the circulator 71. Any signal energy reflected back along the lead 100 is absorbed in the resistance 76 through the fourth port 75 of the circulator 71. The use of the nearly loss-free, high dielectric constant material for the resonator instead of the conventional metallic waveguide cavity provides an amplifier of improved efficiency at millimeter and higher wavelengths.

Ideally, the rutile resonator 89 is constructed so that it is resonant at the carrier, pump and idler frequencies of interest. As a practical matter, it is possible to provide a rutile resonator which will properly oscillate at two of the desired frequencies. To require that the rutile resonator properly oscillate at the three frequencies of interest places a considerable restriction on the construction of the rutile resonator. This is true since the frequencies are not necessarily harmonically related and can occur in a wide range of frequencies. Several approaches can be taken to reduce this restriction. A tunable waveguide cavity, not shown, can be mounted on the wall of the waveguide 77 in close proximity to the diode mounted rutile resonator 89. By tuning the added waveguide cavity to support one of the three frequencies of interest, for example, the pump frequency, the rutile resonator 89, which may not normally be resonant at that frequency, is encouraged to oscillate at the third frequency. In this manner, the three frequencies are supported by the rutile cavity 89 across the diode 88, providing the desired parametric action.

The rutile resonator 89 shown in FIG. 8 can be constructed in the manner of that shown in FIG. 7. In this case, the larger rutile element 60 is dimensioned to support two of the frequencies of interest, for example, the carrier and idler frequencies, with the smaller rutile element 61 being dimensioned to support the higher or pump frequency. The diode 88, shown in FIG. 8, is positioned so that it couples to the main electric fields at the frequencies of interest in the two resonators, resulting in the interaction of the frequencies across the diode 88 to produce parametric amplification.

FIG. 9 is a simplified circuit diagram showing the manner in which the arrangement of FIG. 1 can be modified to provide a mixer. A variable capacitance, diode mounted rutile resonator assembly 105 is shown in FIG. 9 in block form. The assembly 105 can be of the same construction as the assembly 15 shown in FIG. 1. A D.C. bias source 106 corresponding to the D.C. bias source 32 in FIG. 1 is arranged to provide the proper reverse bias voltage to the junction diode included in the assembly 105. A signal input means in the form of an inductor 107 and a pair of input terminals 108, 109 is connected in the direct current path completed through the assembly 105 and source 106. A capacitor 110 serves to by-pass RF around the source 106. Signal energy of a first frequency is applied across the inductor 107 via terminals 108, 109. The reverse bias voltage and therefore the capacitance of the junction diode included in the assembly 105 is made to vary at the frequency of the received signal energy. By this operation, the signal energy of the first frequency interacts across the diode with the signal energy of a second frequency magnetically coupled from the waveguide 12 in FIG. 1 to the rutile resonator included in the assembly 105. The rutile resonator is constructed in the manner described above to be resonant at the first and second frequencies and at the sum or difference frequency resulting from the interaction of the first and second frequency signals across the diode. A tapered waveguide section as shown in FIG. 1 or other suitable means can be used to couple signal energy at the desired sum or difference frequency to a utilization circuit.

FIG. 10 is partly a perspective view and partly a block diagram of a simplified tunnel diode amplifier. A waveguide section 111 is shown. A tunnel diode mounted rutile resonator assembly 112 is positioned on the waveguide 111. Since the construction of the diode mounted rutile resonator and the means for positioning the resonator in the waveguide 111 can be substantially the same as that of the corresponding structure already described, the construction is shown by dotted lines. The tunnel diode 113 is secured to the surface of the rutile resonator 114 so that the diode 113 couples to the main electric field at the frequency of interest present on the surface of the rutile resonator 114. A D.C. bias source 104 serves to supply across the tunnel diode 113 a proper forward bias of approximately 100 millivolts, for example, by means of terminals 115, 116 and leads 117, 118. The construction of the assembly 112 including a pair of RF by-pass capacitors 119, 120 connected by means of the terminal 121 between the respective terminals 115, 116 and ground can be the same as that shown in FIGS. 1, 2 and 3.

Signal energy of given frequency to be amplified is applied to a first port 122 of a ferrite circulator 123. The circulator 123 can be similar in construction and operation to the circulator 71 shown in FIG. 1. The signal energy incident on the first port 122 is fed from the second port 124 of the circulator 123 to the waveguide 111 by means of coaxial or other connections represented by lead 125 and a coaxial-to-waveguide transducer 126. The signal energy is magnetically coupled from the waveguide 111 to the rutile resonator 114 which is dimensioned to be resonant at the given frequency. A movable shorting plunger or plate 131 serves to provide the maximum coupling between the waveguide 111 and rutile resonator 114. The tunnel diode 113, which is coupled to the resulting electric field on the surface of the rutile resonator 114, exhibits a negative resistance determined by the setting of the forward bias applied thereto and, therefore, amplification of the signal energy. The amplified signal energy magnetically coupled to the waveguide 111 from the rutile resonator 114 is fed back to the second port 124 of the circulator 123. The amplified signal energy is fed from the third port 127 to a desired output circuit by connections including the usual filtering means represented in FIG. 10 as lead 128. Any signal energy reflected back along lead 128 to the third port 127 is absorbed in a terminating resistor 129 through the fourth port 130 of the circulator 123, preventing the appearance of the reflected signal energy at the first port 122.

FIG. 11 is partly a perspective view and partly a block diagram of the structure shown in FIG. 10 modified for use as a tunnel diode oscillator. The elements of FIG. 11 are given the same reference numerals as the corresponding elements in FIG. 10. The forward bias applied to the tunnel diode 113 from the source 104 is determined to place the tunnel diode 113 in combination with the rutile resonator 114 in its mode of oscilation. The rutile resonator 114 is dimensioned so that the tunnel diode 113 couples to a main electric field at the desired frequency of the oscillations on the surface of the rutile resonator 114. The resulting signal energy is magnetically coupled in a maximum sense by the setting of the plunger 131 to the waveguide 111. A coaxial-to-waveguide transducer 132 and coaxial connection 133 or other suitable means are used to forward the signal energy from the waveguide 111 to a utilization circuit. For a tunnel diode mixer, an embodiment similar to FIG. 8 can be used. In the mixer case, the diode 88 is replaced by a tunnel diode, and the terminal pair 93, 95 is the output. Whether the tunnel diode mounted rutile resonator is used in an amplifier, FIG. 10, in an oscillator, FIG. 11, in a mixer, or in other circuit arrangements of related construction, the use of the high dielectric constant material for the resonator instead of the conventional metallic waveguide results in more efficient performance at frequencies up to and including millimeter and sub-millimeter wavelengths.

Titanium dioxide or rutile is a preferred material for the resonator because it possesses the desired characteristics to an unusual degree. However, other materials exhibiting similar properties can be used. Any dielectric material which exhibits the low-loss and high dielectric constant characteristics when operated in combination with the non-linear element may be used. Also, the resonator need not be in a cylindrical or disc-like shape. The actual shape of the resonator used can be determined according to the needs of the particular application. However, the cylindrical, and centrally apertured cylindrical disc shapes are especially desirable because they support the desired modes and tend to suppress undesired modes of oscillation.

Reference has been made to the mounting of only a single junction diode or non-linear element on the resonator. FIG. 12 shows a disc 134 of rutile material of the same general construction as that of the resonator 21 shown in FIGS. 1, 2 and 3. Three semiconductor junction diodes 135, 136 and 137 are shown as spaced about the flat surface area near the edge of the disc 134. Either self-biasing means or external biasing means can be provided for the junction diodes 135, 136, 137 in the manner described above. By providing more than one diode, the amount of non-linear interaction possible in a given circuit arrangement resulting in a type of signal conversion is increased. For example, in the case of the parametric amplifier shown in FIG. 8, by mounting more than one diode on the resonator 89, the non-linear interaction possible between the pump, idler and carrier frequencies is increased by an amount determined by the number of diodes used, within limits, resulting in a corresponding increase in the signal amplification. While only three junction diodes 135, 136, 137 are shown in FIG. 12, any number of junction diodes or other non-linear elements can be used according to the needs of a particular application.

While the non-linear junction diode has been used as the active element in the various embodiments described, other non-linear materials either in a bulk or film form, can also be used in conjunction with the rutile resonator to perform amplification, oscillation, modulation, harmonic generation, and so on. For example, a non-linear element in bulk or film form constructed of ferrite material can be substituted for the junction diodes shown in the various embodiments. The operation is apparent from that described above.

What is claimed is:
1. In combination,
a resonator constructed of an insulating material having a dielectric constant higher than 30 and dimensioned to resonate at a desired frequency, and
a non-linear element mounted outside of and immediately adjacent to said resonator in a manner to couple substantially said entire element to a strong electric field of said resonator at said frequency.

2. In combination,
a resonator constructed of titanium dioxide having a dielectric constant higher than 30 and dimensioned to resonate at a desired frequency,
a non-linear element mounted outside of and immediately adjacent to said resonator in a manner to couple substantially said entire element to a strong electric field of said resonator at said frequency,
and means for energizing said resonator to resonate in combination with said element at said frequency.

3. A device for processing signal energy at millimeter and higher wavelengths comprising, in combination, an assembly including a resonator constructed of an insulating material having a dielectrical constant greater than 30 dimensioned to resonate at a given frequency and a non-linear element outside of and immediately adjacent to said resonator so that substantially said entire element couples to a strong electric field of said resonator at said frequency,
and means for applying signal energy to said assembly to cause said resonator to resonate in combination with said element at said frequency and for deriving signal energy at said frequency from said assembly.

4. A device for processing signal energy at millimeter and higher wavelengths as claimed in claim 3, and wherein;
said resonator is constructed of an insulating, bulk material.

5. In combination,
a resonator constructed of titanium dioxide material having a dielectric constant greater than 30 and dimensioned to resonate at a given frequency,
an element exhibiting non-linear behavior mounted outside of and immediately adjacent to said resonator in a manner to couple substantially said entire element to a main electric field of said resonator at said frequency,
and means for electromagnetically coupling signal energy to said resonator to cause said resonator to resonate in combination with said element at said frequency and for deriving signal energy at said frequency from said resonator.

6. In a combination as claimed in claim 5,
said resonator being dimensioned in the shape of a solid, annular disc with said main electric field occurring as a tangential and azimuthal electric field with respect to and near the curved edge of said disc,
said element being mounted near said edge to provide the maximum coupling of electric energy between said main electric field and said element.

7. In a combination as claimed in claim 5,
said resonator being dimensioned in the shape of a hollow, flat ended cylindrical member to form a TEM coaxial resonator with said main electric field occurring as a tangential and azimuthal electric field with respect to and near the curved edge of said member,
said element being mounted on said member near said edge to provide the maximum coupling of electric energy between said main electric field and said element.

8. In combination,
a resonator constructed of titanium dioxide material having a dielectric constant greater than 30 and dimensioned to resonate at a first and a second radio frequency,
an element exhibiting non-linear behavior mounted outside of and immediately adjacent to said resonator in a manner to couple substantially said entire element to main electric fields of said resonator at said first and said second frequency,
and means for applying electrical energy of said first frequency to said resonator to cause said resonator to resonate in combination with said element at said first and said second frequency.

9. In a combination as claimed in claim 8,
said resonator being dimensioned in the shape of a first solid cylindrical member and a second solid cylindrical member,
said first member being dimensioned to resonate at said first frequency and said second member being dimensioned to resonate at said second frequency,
said element being mounted between said members so that said element is coupled to the main electric field at said second frequency of said second member and to the main electric field at said first frequency of said first member, said means applying electrical energy of said first frequency to said first member and deriving electrical energy of said second frequency from said second member.

10. A device for processing signal energy at frequencies up to and including millimeter and higher wavelengths comprising, in combination,
a resonator constructed of a crystalline material having a dielectric constant greater than 30 and dimensioned to resonate at a given frequency so that a strong electric field at said frequency exists on a surface of said resonator,
a non-linear semiconductor alloyed junction diode mounted outside of and directly on said resonator in a manner to provide maximum coupling of electrical energy at said frequency between said electric field and substantially said entire diode,
and means for energizing said resonator to resonate in combination with said diode at said frequency.

11. A device as claimed in claim 10, and wherein;
said diode is a variable capacitance semiconductor alloyed junction diode,
and means for properly reverse biasing said diode to cause said resonator to resonate in combination with said diode at said frequency.

12. A device as claimed in claim 10, and wherein;
said diode is a tunnel diode,
and means for properly forward biasing said diode to cause said resonator to resonate in combination with said diode at said frequency.

13. A device for processing signal energy at frequencies up to and including millimeter and higher wavelengths comprising, in combination,
a resonator constructed of titanium dioxide having a dielectric constant greater than 30,
a plurality of non-linear semiconductor alloyed junction diodes mounted outside of and immediately adjacent to said resonator,
said resonator being dimensioned to resonate in combination with said diodes at a given frequency with said diodes being mounted with said resonator to provide maximum coupling between a main electric field of said resonator at said frequency and substantially the entirety of each of said diodes,
and means for energizing said resonator to resonate in combination with said diodes at said frequency.

14. In combination,
a resonator comprising material having a dielectric constant greater than 30,
a waveguide having a waveguiding space of a lower dielectric constant in which space said resonator is immersed, and
a non-linear element mounted outside of said resonator at the interface between said resonator and said waveguiding space with substantially said entire element coupled to a strong electric field of said resonator.

15. In combination,
a resonator comprising material having a dielectric constant greater than 30 and dimensioned to resonate at a desired frequency,
a substantially lower dielectric constant ambient in which said resonator is immersed, and
a non-linear element mounted outside of said resonator at the interface between said material of said resonator and said ambient with substantially said entire element coupled to a strong electric field of said resonator at said frequency.

16. A device for processing signal energy of frequencies up to and including millimeter and higher wavelengths comprising, in combination,
a waveguide dimensioned to support a given band of frequencies,
an assembly including a resonator constructed of titanium dioxide having a high dielectric constant and a non-linear semiconductor junction diode mounted directly on said resonator,
said resonator being dimensioned to resonate in combination with said diode at a given frequency included in said band with said diode being mounted on said resonator to provide maximum coupling between a main electric field of said resonator at said frequency and said diode,
and means for mounting said assembly within said waveguide to provide maximum coupling between the magnetic field of said resonator and the magnetic field of said waveguide.

17. A harmonic generator comprising, in combination,
a resonator constructed of titanium dioxide having a high dielectric constant and dimensioned to resonate at a fundamental and harmonic frequency,
a variable capacitance, semiconductor junction diode mounted directly on said resonator so that said diode couples to main electric fields of said resonator at said fundamental and said harmonic frequency,
means to reverse bias said diode to determine the capacitance presented by said diode,
a waveguide,
means for coupling signal energy of said fundamental frequency into said waveguide,
means for positioning said diode mounted resonator in said waveguide to cause said signal energy to be magnetically coupled from said waveguide to said resonator thereby energizing said resonator to resonate in combination with the capacitance presented by said diode at said fundamental and harmonic frequencies with the result that signal energy of said harmonic frequency is coupled from said resonator to said waveguide,
and means for deriving from said waveguide signal energy at said harmonic frequency.

18. An amplifier comprising, in combination,
a resonator constructed of titanium dioxide dimensioned to resonate at a given frequency,
a non-linear semiconductor junction diode mounted directly on said resonator with said diode being coupled to a main electric field of said resonator at said frequency,
a waveguide,
means to couple signal energy of said frequency into said waveguide,
means to position said diode mounted resonator within said waveguide to cause said signal energy to be magnetically coupled to said resonator thereby causing said resonator to resonate in combination with said diode at said frequency,
said diode being responsive to said main electric field to produce amplification of said signal energy at which said resonator is resonate with the result that amplified signal energy at said frequency is magnetically coupled from said resonator into said waveguide,
and means for deriving said amplified signal energy at said frequency from said waveguide.

19. An amplifier as claimed in claim 18, and wherein;
said diode is a tunnel diode,
means to forward bias said diode at the proper level to cause said diode to produce amplification of said signal energy in response to said main electric field.

20. A parametric amplifier comprising, in combination,
a resonator constructed of titanium dioxide and dimensioned to resonate at a carrier frequency, a pump frequency, and an idler frequency equal to the difference between said carrier and pump frequencies,
a variable capacitance, semiconductor junction diode directly mounted on said resonator in a manner to couple said diode to electric fields of said resonator at said pump, carrier and idler frequencies, a waveguide, means to couple signal energy of said carrier frequency and said pump frequency into said waveguide, means for positioning said diode mounted resonator within said waveguide so that said signal energy of said pump and said carrier frequency is magnetically coupled from said waveguide to said resonator energizing said resonator to resonate at said pump and said carrier frequency, said diode being operated in response to said electric fields to produce a non-linear interaction of said pump and said carrier frequency to cause said resonator to resonate at said idler frequency with the result that said diode is driven at the sum of said carrier and said idler frequency thereby adding energy to said carrier frequency signal energy by said pump frequency signal energy, and means for deriving from said waveguide the resulting amplified signal energy of carrier frequency which is magnetically coupled to said waveguide from said resonator.

21. A parametric amplifier as claimed in claim 20, and wherein:

said resonator includes a first cylindrical member constructed of titanium dioxide and dimensioned to resonate at said carrier and said idler frequency and a second cylindrical member constructed of titanium dioxide and dimensioned to resonate at said pump frequency, said diode being mounted between said members to couple to main electric fields of said first member at said carrier and said idler frequency and to couple to a main electric field of said second member at said pump frequency.

22. In combination, a resonator constructed of titanium dioxide and dimensioned to resonate at first, second and third frequencies, a non-linear semiconductor junction diode mounted directly on said resonator in a manner to couple to electric fields of said resonator at said first, second and third frequencies, a waveguide, means to couple signal energy of said first frequency into said waveguide, means to position said diode mounted resonator inside said waveguide to magnetically couple said signal energy of said first frequency from said waveguide to said resonator energizing said resonator to resonate at said first frequency, means to apply signal energy of said second frequency across said diode in a manner to produce a non-linear interaction of said first and second frequencies across said diode which causes said resonator to resonate at said third frequency, and means to derive from said waveguide the resulting signal energy at said third frequency which is magnetically coupled to said waveguide from said resonator.

23. An oscillator comprising, in combination, a resonator constructed of titanium dioxide and dimensioned to resonate at a given frequency, a tunnel diode directly mounted on said resonator in a manner to couple to a main electric field of said resonator at said frequency, means to apply a forward bias to said diode of the proper value to place said diode in combination with said resonator in its mode of oscillation at said frequency, a waveguide, means to position said diode mounted resonator within said waveguide so that signal energy at said frequency is magnetically coupled from said resonator to said waveguide, and means for deriving said signal energy from said waveguide.

References Cited by the Examiner
UNITED STATES PATENTS

| | | | |
|---|---|---|---|
| 2,890,422 | 6/1959 | Schlicke | 333—83 |
| 3,056,092 | 9/1962 | Cook et al. | 330—4.8 |
| 3,114,881 | 12/1963 | Uenohara | 330—4.9 |

OTHER REFERENCES

Gruenberg: "Proc. IRE," October 1960, pp. 1779–1780.

ROY LAKE, *Primary Examiner.*

D. HOSTETTER, *Assistant Examiner.*